(12) United States Patent
Anke et al.

(10) Patent No.: US 8,296,408 B2
(45) Date of Patent: Oct. 23, 2012

(54) DISTRIBUTING RELOCATABLE SERVICES IN MIDDLEWARE FOR SMART ITEMS

(75) Inventors: Juergen Anke, Dresden (DE); Mario Neugebauer, Dresden (DE)

(73) Assignee: SAP AG, Walldorf (DE)

( * ) Notice: Subject to any disclaimer, the term of this patent is extended or adjusted under 35 U.S.C. 154(b) by 1395 days.

(21) Appl. No.: 11/433,621

(22) Filed: May 12, 2006

(65) Prior Publication Data

US 2007/0282746 A1 Dec. 6, 2007

(51) Int. Cl.
*G06F 15/173* (2006.01)
*G06F 15/16* (2006.01)
*G08B 23/00* (2006.01)

(52) U.S. Cl. .................. 709/223; 709/201; 340/500

(58) Field of Classification Search .......... 709/201–203, 709/217–226; 702/33–80, 127
See application file for complete search history.

(56) References Cited

U.S. PATENT DOCUMENTS

| | | | |
|---|---|---|---|
| 6,016,499 A | 1/2000 | Ferguson |
| 6,023,702 A | 2/2000 | Leisten et al. |
| 6,138,162 A | 10/2000 | Pistriotto et al. |
| 6,189,038 B1 | 2/2001 | Thompson et al. |
| 6,226,788 B1 | 5/2001 | Schoening et al. |
| 6,292,856 B1 | 9/2001 | Marcotte |
| 6,363,411 B1 | 3/2002 | Dugan et al. |
| 6,378,128 B1 | 4/2002 | Edelstein et al. |
| 6,460,082 B1 | 10/2002 | Lumelsky et al. |
| 6,480,977 B1 | 11/2002 | Apisdorf et al. |
| 6,785,707 B2 | 8/2004 | Teeple |
| 6,816,862 B2 | 11/2004 | Mulgund et al. |
| 6,832,373 B2 | 12/2004 | O'Neill |
| 6,847,974 B2 | 1/2005 | Wachtel |
| 6,859,831 B1 | 2/2005 | Gelvin et al. |
| 6,891,823 B1 | 5/2005 | Schwartz et al. |
| 6,961,763 B1 | 11/2005 | Wang et al. |
| 6,980,993 B2 | 12/2005 | Horvitz et al. |
| 6,990,660 B2 | 1/2006 | Moshir et al. |

(Continued)

FOREIGN PATENT DOCUMENTS

EP 0697654 A1 2/1996

(Continued)

OTHER PUBLICATIONS

Foster, I. et al., "The Open Grid Services Architecture, Version 1.0", Informational Document, Global Grid Forum (Jan. 29, 2005), pp. 1-62.

(Continued)

*Primary Examiner* — Shirley Zhang
(74) *Attorney, Agent, or Firm* — Brake Hughes Bellermann LLP

(57) ABSTRACT

A composite service associated with an analysis of data may be determined, the composite service associated with service metadata and including first and second component services having an ordering of execution for the analysis of the data based on the service metadata. The first component service, configured to generate a first result, may be deployed to a first service execution environment located at a device layer. The second component service, configured to generate a second result based on the first result, may be deployed to a second service execution environment located at a device handling layer. A request for an analysis result associated with the analysis of data may be received. The composite service may be invoked based on an entry point. The analysis result may be received, and may be based on the second result generated by the second component service.

18 Claims, 5 Drawing Sheets

U.S. PATENT DOCUMENTS

| | | | |
|---|---|---|---|
| 7,003,663 B2* | 2/2006 | Lagosanto et al. ............ | 713/159 |
| 7,072,960 B2 | 7/2006 | Graupner et al. | |
| 7,075,960 B2 | 7/2006 | Kohara et al. | |
| 7,099,582 B2 | 8/2006 | Belhadj-Yahya et al. | |
| 7,099,946 B2 | 8/2006 | Lennon et al. | |
| 7,114,146 B2 | 9/2006 | Zhang et al. | |
| 7,130,773 B1* | 10/2006 | Wong ........................... | 702/189 |
| 7,152,019 B2* | 12/2006 | Tarantola et al. ............. | 702/186 |
| 7,171,471 B1 | 1/2007 | Nair | |
| 7,206,289 B2 | 4/2007 | Hamada | |
| 7,237,243 B2 | 6/2007 | Sutton et al. | |
| 7,286,158 B1* | 10/2007 | Griebenow ................... | 348/156 |
| 7,292,963 B2 | 11/2007 | Bornhoevd et al. | |
| 7,302,401 B1 | 11/2007 | Tervonen | |
| 7,304,976 B2 | 12/2007 | Mao et al. | |
| 7,313,467 B2 | 12/2007 | Breed et al. | |
| 7,557,707 B2 | 7/2009 | Kumar et al. | |
| 7,616,642 B2 | 11/2009 | Anke et al. | |
| 7,752,068 B1 | 7/2010 | Micklavzina et al. | |
| 7,860,968 B2 | 12/2010 | Bornhoevd et al. | |
| 7,890,568 B2 | 2/2011 | Belenki | |
| 7,930,143 B2 | 4/2011 | Tarantola et al. | |
| 8,001,527 B1 | 8/2011 | Qureshi et al. | |
| 8,005,879 B2 | 8/2011 | Bornhoevd et al. | |
| 8,065,411 B2 | 11/2011 | Spiess et al. | |
| 8,156,208 B2 | 4/2012 | Bornhoevd et al. | |
| 8,201,191 B2 | 6/2012 | Ladd et al. | |
| 2002/0007422 A1 | 1/2002 | Bennett | |
| 2002/0100036 A1 | 7/2002 | Moshir et al. | |
| 2002/0161751 A1 | 10/2002 | Mulgund et al. | |
| 2002/0184103 A1 | 12/2002 | Shah et al. | |
| 2002/0184348 A1* | 12/2002 | Rapp et al. .................... | 709/220 |
| 2003/0033351 A1* | 2/2003 | Ricciardi ....................... | 709/202 |
| 2003/0050902 A1 | 3/2003 | Buczak et al. | |
| 2003/0078946 A1 | 4/2003 | Costello et al. | |
| 2003/0097443 A1 | 5/2003 | Gillett et al. | |
| 2003/0217186 A1 | 11/2003 | Bushey | |
| 2004/0121792 A1 | 6/2004 | Allen et al. | |
| 2004/0166807 A1* | 8/2004 | Vesikivi et al. .............. | 455/41.2 |
| 2004/0181541 A1 | 9/2004 | Groenendaal et al. | |
| 2004/0193703 A1 | 9/2004 | Loewy et al. | |
| 2004/0220910 A1 | 11/2004 | Zang et al. | |
| 2004/0243352 A1 | 12/2004 | Morozumi et al. | |
| 2004/0250113 A1 | 12/2004 | Beck | |
| 2005/0060365 A1 | 3/2005 | Robinson et al. | |
| 2005/0080892 A1 | 4/2005 | Moser et al. | |
| 2005/0120342 A1* | 6/2005 | Saracco et al. ................ | 717/162 |
| 2005/0198228 A1 | 9/2005 | Bajwa et al. | |
| 2005/0228763 A1 | 10/2005 | Lewis et al. | |
| 2005/0235058 A1 | 10/2005 | Rackus et al. | |
| 2005/0251783 A1 | 11/2005 | Torone et al. | |
| 2006/0022801 A1 | 2/2006 | Husak et al. | |
| 2006/0029054 A1 | 2/2006 | Breh et al. | |
| 2006/0047545 A1 | 3/2006 | Kumar et al. | |
| 2006/0052882 A1 | 3/2006 | Kubach et al. | |
| 2006/0074912 A1 | 4/2006 | Borthakur et al. | |
| 2006/0085798 A1 | 4/2006 | Bendiksen et al. | |
| 2006/0101453 A1 | 5/2006 | Burkhart et al. | |
| 2006/0161909 A1 | 7/2006 | Pandey et al. | |
| 2006/0173726 A1 | 8/2006 | Hall et al. | |
| 2006/0206582 A1 | 9/2006 | Finn | |
| 2006/0212453 A1 | 9/2006 | Eshel et al. | |
| 2006/0218244 A1* | 9/2006 | Rasmussen et al. .......... | 709/218 |
| 2006/0235976 A1 | 10/2006 | Chen et al. | |
| 2006/0265661 A1 | 11/2006 | Ball | |
| 2006/0277079 A1 | 12/2006 | Gilligan et al. | |
| 2006/0277539 A1 | 12/2006 | Amarasinghe et al. | |
| 2007/0006122 A1 | 1/2007 | Bailey et al. | |
| 2007/0032244 A1 | 2/2007 | Counts et al. | |
| 2007/0112574 A1 | 5/2007 | Greene | |
| 2007/0118496 A1* | 5/2007 | Bornhoevd et al. ................. | 707/1 |
| 2007/0118549 A1* | 5/2007 | Bornhoevd et al. ........... | 707/101 |
| 2007/0118560 A1* | 5/2007 | Bornhoevd et al. ........ | 707/104.1 |
| 2007/0130208 A1* | 6/2007 | Bornhoevd et al. ........ | 707/104.1 |
| 2007/0168925 A1* | 7/2007 | Bornhoevd et al. ........... | 717/104 |
| 2007/0233881 A1* | 10/2007 | Nochta et al. ................. | 709/228 |
| 2007/0251998 A1* | 11/2007 | Belenki ......................... | 235/380 |
| 2007/0276619 A1 | 11/2007 | Sugahara et al. | |
| 2007/0276674 A1 | 11/2007 | Hemmat | |
| 2007/0282988 A1 | 12/2007 | Bornhoevd et al. | |
| 2007/0283001 A1 | 12/2007 | Spiess et al. | |
| 2007/0283002 A1 | 12/2007 | Bornhoevd et al. | |
| 2007/0294362 A1 | 12/2007 | Patel | |
| 2008/0010284 A1 | 1/2008 | Beck | |
| 2008/0033785 A1 | 2/2008 | Anke | |
| 2008/0052314 A1 | 2/2008 | Batabyal | |
| 2008/0306798 A1 | 12/2008 | Anke et al. | |
| 2009/0097397 A1 | 4/2009 | Moreira Sa de Souza | |
| 2011/0185433 A1 | 7/2011 | Amarasinghe et al. | |

FOREIGN PATENT DOCUMENTS

| | | |
|---|---|---|
| EP | 0810755 A3 | 3/1999 |
| EP | 1372073 A2 | 12/2003 |
| EP | 1788480 A2 | 5/2007 |
| EP | 1863223 A1 | 12/2007 |
| EP | 1892656 A1 | 2/2008 |
| WO | 2005106666 A1 | 11/2005 |

OTHER PUBLICATIONS

Baker, M. et al., "Grids and Grid Technologies for wide-area Distributed Computing", Software—Practice & Experience (Sep. 27, 2002), pp. 1437-1466.

Mikic-Rakic, M et al., "Improving availability in large, distributed component-based systems via redeployment", LNCS, vol. 3798 (Nov. 3, 2005), 15 pgs.

Malek, S et al., "A decentralized redeployment algorithm for improving the availability of distributed systems", LNCS, vol. 3798 (Nov. 3, 2005), 13 pgs.

Hoareau, D et al., "Constraint-Based Deployment of Distributed Components in a Dynamic Network", LNCS, vol. 3894 (Mar. 16, 2006), pp. 450-464.

Bitkom, "RFID White Paper Technology, Systems and Applications", An Overview for companies seeking to use RFID technology to connect their IT systems directly to the "real" world, Dec. 2005, 50 pgs.

Mikic-Rakic, M et al., "A tailorable environment for assessing the quality of deployment architectures in highly distributed settings", Second International Working Conference on Component Deployment (2004), pp. 1-15.

Ploennigs, J et al., "A traffic model for networked devices in the building automation", In: Proceedings of the 5th IEEE International Workshop on Factory Communication Systems (WFCS 2004), Vienna, Austria, (2004), pp. 137-145.

Wu, Q et al., "Adaptive component allocation in scudware middleware for ubiquitous computing", LNCS, vol. 3824 (Dec. 6, 2005), pp. 1155-1164.

Wegdam, M et al., "Dynamic reconfiguration and load distribution in component middleware", PhD thesis, University of Twente, Enschede, (2003), pp. 1-257.

Colt, Charles et al., "Oracle Â® Collaboration Suite, Deployment Guide10g Release 1 (10.1.1) B14479-02", (Oct. 2005), pp. 1-230.

Malek, S et al., "A style-aware architectural middleware for resource-constrained,distributed systems", IEEE Transactions on Software Engineering, vol. 31, Issue 3 (Mar. 2005), pp, 256-272.

Lacour, S et al., "A Software Architecture for Automatic Deployment of CORBA Components Using Grid Technologies", Networking and Internet Architecture, DECOR04 (Nov. 24, 2004), pp. 187-192.

Kichkaylo, T et al., "Constrained Component Deployment in Wide-Area Networks Using AI Planning Techniques", Proceedings of the 17th International Symposium on Parallel and Distributed Processing 2003), pp. 1-10.

Akehurst, D H., et al., "Design Support for Distributed Systems: DSE4DS", Procedings of the 7th Cabernet Radicals Workshop (Oct. 2002), pp. 1-6.

Kichkaylo, T et al., "Optimal Resource-Aware Deployment Planning for Component-Based Distributed Applications", HPDC '04: Proceedings of the 13th IEEE International Symposium on High Performance Distributed Computing (HPDC '04), IEEE Computer Society (2004), pp. 150-159.

Wu, X et al., "Performance modeling from software components", ACM SIGSOFT Software Engineering Notes, vol. 29, Issue 1 (Jan. 2004), pp. 290-301.

Stewart, C et al., "Profile driven Component Placement for Cluster-based Online Services", IEEE Distributed Systems Online, vol. 5, No. 10, (Oct. 2004), p. 1-6.

Perkins, C. et al., "IP Mobility Support for IPv4", IETF Standard, Internet Engineering Task Force (Aug. 2002), pp. 1-100.

Anke, J. et al., "Early Data Processing in Smart Item Environments Using Mobile Services", Proceedings of the 12th IFAC Symposium on Information Control Problems in Manufacturing—INCOM, (May 19, 2006), pp. 823-828.

Carzaniga, Antonio et al., "Designing distributed applications with mobile code paradigms", In: Proceedings of the 19th International Conference on Software Engineering, Boston, Massachusetts, (1997), pp. 22-32.

Chandra, Bharat et al., "Resource management for scalable disconnected access to web services", WWW '01: Proceedings of the 10th International Conference on World Wide Web (May 5, 2001), pp. 245-256.

ETSI, "Selection procedures for the choice of radio transmission technologies of the UMTS", Universal Mobile Telecommunications System 30.03 version 3.2.0 (Apr. 1998), pp. 1-84.

Fredriksson, Johan et al., "Calculating Resource Trade-offs when Mapping Component Services to Real-Time Tasks", Fourth Conference on Software Engineering Research and Practice (Oct. 2004), pp. 1-8.

Deering, S. et al., "ICMP Router Discovery Messages", IETF Standard, Internet Engineering Task Force (Sep. 1991), pp. 1-19.

Sgroi, Marco et al., "A Service-Based Universal Application Interface for Ad-hoc Wireless Sensor Networks", Preliminary Draft (Nov. 26, 2003), pp. 1-39.

Srivastava, Utkarsh et al., "Operator Placement for In-Network Stream Query Processing", Proceedings of the 24th ACM SIGMOD-SIGACT-SIGART Symposium on Principles of Database Systems (Dec. 2004), pp. 1-10.

Vigna, Giovanni "Mobile Code Technologies, Paradigms, and Applications", PhD Thesis, Politecnico di Milano, Milano, Italy, (1998), pp. 1-89.

Buschmann, C et al., "Towards Information Centric Application Development for Wireless Sensor Networks", In Proceedings of the System Support for Ubiquitous Computing Workshop (UbiSys) at the Sixth Annual Conference on Ubiquitous Computing (UbiComp 2004), pp. 1-12.

Overeinder, B. et al., "A Dynamic load balancing system for parallel cluster computing", Future Generations computer Systems, Elsevier Science Publishers, Amsterdam, 12, (1), (May 1996), pp. 101-115.

Foster, I. et al., "Globus: A Metacomputing Infrastructure Toolkit", The International Journal of Supercomputer Application and High performance Computing, MIT Press, US, 11 (2), (Jun. 21, 1997), pp. 115-128.

Ferreira, L. et al., "Introduction to Grid Computing with globus", IBM International Technical Support Organization, 2nd edition (Sep. 2003), pp. 1-58.

Graupner, S. et al., "A framework for analyzing and organizing complex systems", Proceedings of Seventh IEEE International Conference on Engineering of Complex Computer Systems, Jun. 11-13, 2001, Piscataway, NJ, USA, (Jun. 11, 2001), pp. 155-165.

Bornhoevd, C. et al., "Integrating Smart Items with Business Processes an Experience Report", IEEE Proceedings of the 38th Hawaii International Conference on System Sciences (Jan. 3, 2005), pp. 1-8.

Bornhoevd, Christof et al., "Integrating Automatic Data Acquisition with Business Processes Experiences with SAPs Auto-ID Infrastructure", Very Large Data Conference (Sep. 3, 2004), pp. 1-8.

Boudec, Jean-Yves L., et al., "A Theory of Deterministic Queuing Systems for the Internet", Network Calculus, Online Version of the Book Springer Verlag—LNCS 2050, (May 10, 2004), pp. 1-269.

Yoonhee, K. et al., "Wapee: A Fault-Tolerant Semantic Middleware in Ubiquitous Computing Environments", Proceedings of EUC Workshops, 2006, pp. 173-182.

Wiemann, M. et al., "A Service and Device Monitoring Service for Smart Items Infrastructures", Third International Conference on Wireless and Mobile Communications 2007, ICWMC, 6 pages.

Paradis, L. et al., "A survey of Fault Management in Wireless Sensor Networks", Journal of Network and systems management, Kluwer Academic Publishers, NE, vol. 15 No. 2, Mar. 13, 2007, pp. 171-190.

Anke, J. et al., "Cost-based Deployment Planning for Components in Smart Item Environments", IEEE Conference on Emerging Technologies and Factory Automation, Sep. 2006, pp. 1238-1245.

Anke, J. et al., "A Planning Method for Component Placement in Smart Item Environments Using Heuristic Search", Proceedings of the 7th IFIP WG 6.1 International Conference, Distributed Applications and Interoperable Systems, Jun. 2007, pp. 309-322.

Anke, J. et al., "A Service-Oriented Middleware for Integration and Management of Heterogeneous Smart Items Environments", Proceedings of the 4th MiNEMA Workshop, Jul. 2006, pp. 7-11.

Golatowski, F et al., "Service-Oriented Software Architecture for Sensor Networks", International Workshop on Mobile Computing (Jun. 17-18, 2003), pp. 1-8.

Decasper, D. et al., "Router Plugins: A Software Architecture for Next Generation Routers", Computer Communication Review (Oct. 1998), pp. 229-240.

Wonohoesodo, R et al., "A Role Based Access Control for Web Services", Proceedings of the 2004 IEEE International Conference on Services Computing (2004), pp. 49-56.

Prabhu, B S., et al., "WinRFID—A Middleware for the Enablement of Radio Frequency Identification (RFID) Based Applications", Mobile, Wireless and Sensor Networks (Mar. 28, 2006), pp. 1-23.

Information Society Technologies, "State of the Art in Resource Management on Wired and Wireless Access Networks with Resilience", Jul. 23, 2004, pp. 1-198.

Carvalho, H et al., "A General Data Fusion Architecture", Proceedings of the 6th International Conference on Information Fusion (Jul. 2003), pp. 1-8.

Hawick, K A., et al., "Middleware for Wireless Sensors and Robots", DHPC Technical Report DHPC-112 (Aug. 18, 2002), pp. 1-6.

European Search Report for Application No. EP07005127.1, mailed Jul. 20, 2007, pp. 1-3.

European Search Report for Application No. EP07008409.0, mailed Aug. 24, 2007, pp. 1-4.

European Search Report for Application No. EP07009428.9, mailed Oct. 4, 2007, pp. 1-4.

European Search Report for Application No. EP07014724.4, mailed Nov. 27, 2007, pp. 1-4.

European Search Report for Application No. EP06023720.3, mailed Apr. 10, 2007, pp. 1-4.

European Search Report for Application No. EP06023256.8, mailed May 9, 2007, pp. 1-5.

Extended European Search Report for Application No. 08017795.9, mailed Feb. 10, 2009, 11 pgs.

"Composite Capability/Preference Profiles (CC/PP): Structure and Vocabularies 1.0", W3C Recommendation (Jan. 15, 2004), pp. 1-78.

Spiess, Patrik et al., "Going Beyond Auto-ID: A Service-oriented Smart Items Infrastructure", Journal of Enterprise Information Management, vol. 20, Issue 3 (2007), pp. 1-9.

Yao, Yong et al., "Query Processing for Sensor Networks", Proceedings of the 2003 CIDR Conference, Jan. 2003, 12 pages.

Skouteli, Chara et al., "Concept-Based Discovery of Mobile Services", Proceedings of the 6th International Conference on Mobile Data Management, Ayia Napa Cyprus, May 13, 2005, 5 pages.

Gounaris, Anastasios et al., "Adaptive Query Processing: A Survey", Lecture Notes in Computer Science, vol. 2405, Archive of Proceedings of the 19th British National Conference on Databases: Advances in Databases, 2002, pp. 11-25.

Hill, Jason Lester, "System Architecture for Wireless Sensor Networks", Dissertation of Jason L. Hill, University of California, Berkeley (2003), 196 pages.

"FAQ: Fault management—How does Fault Management Work?" GoAhead Software (2000), 9 pgs.

Spiess, P., et al, "Collaborative Business Items", Deliverable 401: Management & Maintenance Requirements, CoBIs Project No. IST-004270, Version 1.0 (Jan. 2005), 21 pgs.

"FIPA Device Ontology Specification", Foundation for Intelligent Physical Agents (Apr. 9, 2001), pp. 1-15.

Levis, Philip et al., "TinyOS: An Operating System for Sensor Networks", Feb. 17, 2004, pp. 1-32.

Chatterjee, Mainak et al., "WCA: A Weighted Clustering Alogrithm for Mobile Ad Hoc Networks", Cluster Computing 5, Klluwer Academic Publishers, 2002, pp. 193-204.
Greenstein, Ben et al., "A Sensor Network Application Construction Kit (SNACK)", SenSys '04, Nov. 3-5, 2004, 12 pages.
"The OSGi Service Platform—Dynamic services for networked devices", Retrieved Nov. 16, 2005 from http://www.osgi.org/osgi_technology/index.asp?section=2, 5 pgs.
"TINYOS: Mission Statement", Retrieved Nov. 16, 2005 from http://www.tinyos.net/speciallmission, 2 pgs.
Bandara, Ayomi et al., "An Ontological Framework for Semantic Description of Devices", Nov. 11, 2004, 2 pgs.
Vasudevan, Sudarshan et al., "Design and Analysis of a Leader Election Algorithm for Mobile Ad Hoc Networks", Proceedings of 12th IEEE ICNP, Oct. 8, 2004, 11 pages.
Liu, Jinshan et al., "QoS-aware Service Location in Mobile Ad-Hoc Networks", Proceedings of the 5th International Conference on Mobile Data Management, Berkeley, CA USA, Jan. 2004, 12 pages.
Liu, Jinshan et al., "Group Management for Mobile Ad Hoc Networks: Design, Implementation and Experiment", Proceedings of the 6th International Conference on Mobile Data Management, Ayia Napa Cyprus, May 13, 2005, 8 pages.
European Search Report for EP Application No. 07010652.1 mailed on Oct. 26, 2007, 3 pgs.
European Search Report for EP Application No. 07010654.7 mailed on Oct. 5, 2007, 4 pgs.
European Search Report for Application No. 07010671.1 mailed on Nov. 16, 2007, 4 pgs.
"MVP Brochure", Bitfone Corporation (2005), www.bitfone.com/usa/uploads/mvp.brochure (Retrieved Sep. 20, 2005), pp. 1-3.
Bellavista, Paolo et al., "The Ubiquitous Provisioning of Internet Services to Portable Devices", Pervasive Computing, Jul. 2002, pp. 81-87.
Domagalski, Ronald et al., "Moglichkeiten der Anfragebearbeitung in mobilen Ad-hoc-Netzwerken", English Title: Possibilties of Query Processing in Mobile Ad Hoc Networks, Contribution to the Workshop "Applications of Mobile Information Technology", Heidelburg German, Full length English translation included, Mar. 23-24, 2004, 12 pages.
Spiess, P., et al., "Collaborative Business Items", Deliverable 401: Final Project Report, CoBIs Project No. IST-004270, Version 2.0 (Mar. 2007), pp. 1-42.
Gao, J., et al "Toward QoS Analysis of Adaptive Service-Oriented Architecture", Service-Oriented System Engineering, IEEE International Workshop (Oct. 20, 2005), pp. 1-8.
Benatallah, B., "Facilitating the Rapid Development and Scalable Orchestration of Composite Web Services", 2005 Springer Science + Business Media, Inc., pp. 1-33.
Buchholz, S. et al., "Adaptation-Aware Web Caching: Caching in the Future Pervasive Web", In: KiVS, (2003), pp. 55-66.
Casati, F., et al "Specification and Implementation of Exceptions in Workflow Management Systems", ACM Transactions on Database Systems, vol. 24, No. 3, Sep. 1993, pp. 405-451.
Hasiotis, T., et al., "Sensation: A Middleware Integration Platform for Pervasive Applications in Wireless Sensor Networks", Proceedings of the 2nd European Workshop on Wireless Sensor Networks (Jan. 31, 2005), pp. 1-13.
Hwang, S-Y, et al "Personal Workflows: Modeling and Management", MDM 2003, LNCS 2574, pp. 141-152.
Kotov, V. et al., "Optimization of E-Service Solutions with the Systems of Servers Library", Hewlett Packard, Modeling, Analysis and Simulation of Computer and Telecommunication Systems (Aug. 29, 2000), pp. 575-582.
Sheng, Q. Z., et al "Enabling Personalized Composition and Adaptive Provisioning of Web Services", CAiSE 2004, LNCS 2084, pp. 322-337.
Tolksdorf, R., "Coordination Technology for Workflows on the Web: Workspace", Coordination 2000, LNCS 1906, Springer-Verlag Berlin Heidelberg 2000, pp. 36-50.
Basile, C., et al., "A Survey of Dependability Issues in Mobile Wireless Networks", Technical Report, LAAS CNRS (Feb. 21, 2003), 45 pages.
Non Final Office Action for U.S. Appl. No. 11/444,119, mailed on Aug. 28, 2009, 19 pages.
Non-Final Office Action for U.S. Appl. No. 11/284,195, mailed Nov. 1, 2007, 14 pages.
Non-Final Office Action for U.S. Appl. No. 11/444,119, mailed on Feb. 27, 2009, 23 pages.
Final Office Action for U.S. Appl. No. 11/479,284, mailed Feb. 23, 2009, 29 pages.
Non-Final Office Action for U.S. Appl. No. 11/479,284, mailed May 14, 2008, 16 pages.
Non-Final Office Action for U.S. Appl. No. 11/396,299, mailed Jul. 9, 2009, 15 pages.
Final Office Action for U.S. Appl. No. 11/283,618, mailed May 13, 2009, 32 pages.
Non-Final Office Action for U.S. Appl. No. 11/283,618, mailed Oct. 28, 2008, 35 pages.
U.S. Appl. No. 11/810,357, filed Jun. 5, 2007.
Ardaiz, et al, "On Service Deployment in Ubiquitous Computing", Proceedings of the 2nd International Workshop on Ubiquitous Computing and Communications, Sep. 2001, 7 pages.
Arkin, et al, "Web Services Business Process Execution Language Version 2.0", Committee Draft, Sep. 2005, 81 pages.
Arkin, et al, "Web Service Choreography Interface (WSCI) Version 1.0", W3C Note, Aug. 2002, 84 pages.
Bohn, et al, "SIRENA—Service Infrastructure for Real-time Embedded Networked Devices: A service oriented framework for different domains", International Conference on Networking, International Conference on Systems and International Conference on Mobile Communications and Learning Technologies, 2006, 6 pages.
Box, et al, "Web Services Eventing (WS-Eventing)", Aug. 2004, 16 pages.
Crossbow, "Wireless Sensor Networks: Sensor and Data-Acquisition Boards", retrieved on Apr. 24, 2005 from http://www.xbow.com/Products/productsdetails.aspx?sid=63, 1 page.
Crossbow, "Stargate: X-Scale Processor Platform SPB 400", retrieved on Dec. 20, 2005 from http://www.xbow.com/Products/productsdetails.aspx?sid=63, 2 pages.
Clement, et al, "UDDI version 3.2, UDDI Spec Technical Committee Draft, OASIS, UDDI Spec TC", Oct. 2004, 420 pages.
Christensen, et al, "Web Services Description Language (WSDL) 1.1", W3C Note, Mar. 2001, 27 pages.
Chackrabarti, et al, "Securing the Pharmaceutical Supply Chain", Technical Report, Auto-ID Centre Institute for Manufacturing, University of Cambridge, Jun. 1, 2003, 19 pages.
California Software Laboratories, "White Paper: The JetSend Appliance Architecture", retrieved from http://www.calsoftlabs.com/whitepapers/jetsend-architecture.html, 2002, 28 pages.
Davenport, "Process Innovation: Reengineering work through information technology", Harvard Business School Press, 1993, 6 pages.
de Sales, et al, "Towards the UPnP-UP: Enabling User Profile to Support Customized Services in UPnP Networks", Proceedings of the 2008 The Second International Conference on Mobile Ubiquitous Computing, Systems, Services and Technologies, 2008, pp. 206-211.
Decker, et al, "CoBIs Platform Survey and State-of-the-Art Sensor Platforms", CoBIs Deliverable Report, Aug. 2005, 51 pages.
Deering, et al, "Internet Protocol, Version 6 (Ipv6) Specification", Network Working Group, Dec. 1998, 39 pages.
Gauger, "FlexCup—Flexible and Efficient Code Updates for Sensor Networks", Summer School on Wireless Sensor Networks and Smart Objects; Universitat Stuttgart, Aug. 29-Sep. 3, 2005, 8 pages.
Geller, et al, "Web Services Eventing (WS-Eventing)", Aug. 2004, 38 pages.
Gudgin, et al, "SOAP Message Transmission Optimization Mechanism", Jan. 25, 2005, 15 pages.
Guttman, "Service Location Protocol", Version 2, Jun. 1999, 55 pages.
Haas, "Service Deployment in Programmable Networks", PhD Thesis, ETH Zurich, Switzerland, 2003, 253 pages.
Hammer, et al, "Reengineering the Corporation—A Manifesto for Business Revolution", Nicholas Brealey Publishing, May 1994, 14 pages.
Han, et al, "Sensor Network Software Update Management: A Survey", Journal of Network Management, 2005, 26 pages.

Intel Research, "An Introduction to Wireless Sensor Networks", Technical Report, 2004, 6 pages.
Karuppiah, et al, "Design and Implementation of Multihomed IPv6 Testbed Network for Research Community: The Malaysian IPv6 Network Operation Centre Experience", IWS2000, APAN Conference, Tsukuba, 2000, 6 pages.
Kim, et al, "A leader election algorithm in a distributed computing system", 5th IEEE Workshop on Future Trends of Distributed Computing Systems, 1995, 5 pages.
Kiselyov, "Functional XML parsing framework: SAX/DOM and SXML parsers with support for XML Namespaces and validation", 2001, 42 pages.
Lampe, et al, "A ubiquitous computing environment for aircraft maintenance", SAC '04: Proceedings of the 2004 ACM Symposium on Applied Computing, 2004, pp. 1586-1592.
Law, et al, "Assessing Security-Critical Energy-Efficient Sensor Networks", 2002, 10 pages.
Malpani, et al, "Leader election algorithms for mobile ad hoc networks", Proceedings of the 4th international Workshop on Discrete Algorithms and Methods for Mobile Computing and Communications, Aug. 11, 2000, pp. 96-103.
Nochta, et al, "Relocatable services and service classification scheme", Authorization Level: Public (PU) Version 1.0, Feb. 2005, 59 pages.
Nokia, "Nokia Intellisync Device Management", Overview for IT Managers, May 2007, 19 pages.
"OSGI Service Platform", Release 3, IOS Press, Mar. 2003, 602 pages.
Parikh, et al, "Security in Sensor Networks", CS 588: Cryptography, 2001, 28 pages.
Park, "Specification of the Bluetooth System: Wireless connections made easy", Covered Core Package version: 1.2, Nov. 2003, 1200 pages.
Passing, "Profiling, Monitoring and Tracing in SAP WebAS", SAP Library, Jun. 22, 2005, 9 pages.
Phillips, "Aqueduct: Robust and Efficient Code Propagation in Heterogeneous Wireless Sensor Networks", Master's Thesis submitted to the Graduate School of the University of Colorado, 2005, 61 pages.
Postel, "Internet Control Message Protocol", Protocol Specification. Request for Comments RFC 792, 1981, 21 pages.
Postel, "Internet Protocol", Protocol Specification, Request for Comments RFC 791, 1983, 51 pages.
Postel, "Transmission Control Protocol", Protocol Specification, Request for Comments RFC 793, 1981, 91 pages.
Postel, "User Datagram Protocol", Protocol Specification, Request for Comment, RFC 768, Information Sciences Institute, 1981, 3 pages.
Rebahi, et al, "Service Management Module (SMM)", 2004, 61 pages.
Rostad, et al, "Closing the Product Lifecycle Information Loops", 18th International Conference on Production Research, 2005, 5 pages.
SAP, "SAP NetWeaver: Providing the foundation to enable and manage change", retrieved on Nov. 10, 2005 from http://www.sap.com/solutions/netweaver/index.epx, 1 page.
SAP, "Security Guide for Mobile Engine 2.1 SP02", SAP Library—SAP Mobile Engine, Dec. 1, 2004, 13 pages.
SAX, "About SAX", retrieved on Jan. 6, 2006 from http://www.saxproject.org/, 1 page.
Scheer, "Aris-Business Process Modeling", Springer 3rd edition, 2000, 10 pages.
Schlimmer, et al, "Devices Profile for Web Services", May 2005, 39 pages.
Schlimmer, et al, "Web Services Dynamic Discovery (WS-Discovery)", Apr. 2005, 42 pages.
Schneider, et al, "Application and Scenarios of RFID technology", Seminar Datenschutzaspekte im Umfeld des Pervasive Computing, 2004, 29 pages.
Schneier, "Applied Cryptography", 2nd edition, John Wiley & Sons, Inc., 1996, 18 pages.
Speiss, et al, "Collaborative Business Items", Sixth Framework Programme, Information Society Technology Technical Report, CoBIsDeliverable D101, 2005, 59 pages.
Speiss, "Collaborative Business Items: Decomposing Business Process Services for Execution of Business Logic on the Item", European Workshop on Wireless Sensor Networks, Istanbul, 2005, 3 pages.
Speiss, et al, "going beyond auto-id—a service-oriented smart items infrastructure", JEIM, Mar. 2007, 9 pages.
Strohbach, et al, "Cooperative Artefacts:Assessing Real World Situations with Embedded Technology", In Proceedings of the 6th International Conference on Ubiquitous Computing, Nottingham, UK, 2004, pp. 250-267.
Sun Microsystems, "Connected Limited Device Configuration", Java™ 2 Platform, Micro Edition (J2ME™) Specification Version 1.1, Mar. 2003, 60 pages.
Sun Microsystems, "Jini Architecture Specification", Version 1.2, Dec. 2001, 26 pages.
Sun Microsystems, "Sun SPOT System: Turning Vision into Reality", Sun SPOT System Project description, 2005, 4 pages.
Talwar, et al, "Approaches for Service Deployment", IEEE Internet Computing, vol. 9(2), Mar.-Apr. 2005, pp. 70-80.
"Universal Plug and Play (UPnP)", Wikepedia, the free encyclopedia, Retrieved on Dec. 20, 2005, from http://en.wikipedia.org/wiki/Universal_Plug_and_Play, 6 pages.
"UPnP Device Architecture 1.0", UPnP Forum, 1999, 80 pages.
van de Loo, et al, "Enterprise Services Design Guide", Version 1.0, SAP, 2005, pp. 1-40.
van der Aalst, "Modelling and analysing workflow using a Petri-net based approach", Proceedings of the 2nd Workshop on Computer-Supported Cooperative Work, Petri nets and related formalisms, 1994, pp. 31-50.
Veizades, et al, "Service Location Protocol. Request for Comments RFC 2165", Network Working Group, Jun. 1997, 72 pages.
VeriSign, "The EPCglobal Network: Enhancing the Supply Chain", VeriSign Technical Report, 2004, 8 pages.
Villanueva, et al, "Context-Aware QoS Provision for Mobile Ad-hoc Network-based Ambient Intelligent Environments", Header Background Image, 12(3), 2006, 13 pages.
Waldo, "The Jini architecture for network-centric computing", Communications of the ACM archive, vol. 42 , Issue 7, Jul. 1999, pp. 76-82.
Wander, et al, "Energy Analysis of Public-Key Cryptography for Wireless Sensor Networks", UC Santa Cruz, Sun . Microsystems Laboratories, 2005, 5 pages.
Wang, et al, "Timing Analysis of Real-Time Networked RFID Systems", Cambridge Auto-ID Lab, Cambridge UK, 2004, 4 pages.
Warneke, et al, "Smart dust: Communicating with a cubic-millimeter computer", Computer, 34(1), 2001, pp. 44-51.
Weiser, "The computer for the 21st century", ACM SIGMOBILE Mobile Computing and Communications Review archive, vol. 3 , Issue 3, Jul. 1999, 6 pages.
"Java Native Interface (JNI)", Wikepedia, the free encyclopedia, Retrieved on Dec. 20, 2005, from http://en.wikipedia.org/wiki/Jini, 6 pages.
"Service Location Protocol (SLP)", Wikepedia, the free encyclopedia, Retrieved on Dec. 20, 2005, from http://en.wikipedia.org/wiki/Service_Location_Protocol, 1 page.
Woods, "Enterprise Services Architecture", Galileo Press, 2003, 10 pages.
Non-Final Office Action for U.S. Appl. No. 11/496,641, mailed Jul. 29, 2010, 55 pages.
Final Office Action for U.S. Appl. No. 11/444,119, mailed Aug. 24, 2010, 28 pages.
Advisory Action for U.S. Appl. No. 11/284,195, mailed Oct. 9, 2008, 4 pages.
Non-Final Office Action for U.S. Appl. No. 11/479,284, mailed Oct. 30, 2009, 19 pages.
Final Office Action for U.S. Appl. No. 11/284,195, mailed Jun. 25, 2008, 31 pages.
Non-Final Office Action for U.S. Appl. No. 11/284,195, mailed Nov. 1, 2007, 17 pages.
Non-Final Office Action for U.S. Appl. No. 11/283,618, mailed May 24, 2010, 42 pages.
Final Office Action for U.S. Appl. No. 11/479,284, mailed Jun. 11, 2009, 4 pages.

Non-Final Office Action for U.S. Appl. No. 11/479,284, mailed Aug. 11, 2010, 19 pages.
Non-Final Office Action for U.S. Appl. No. 11/583,274, mailed Oct. 7, 2009, 22 pages.
Non-Final Office Action for U.S. Appl. No. 11/583,274, mailed Aug. 5, 2010, 21 pages.
Final Office Action for U.S. Appl. No. 11/396,299, mailed Jan. 28, 2010, 54 pages.
Non-Final Office Action for U.S. Appl. No. 11/413,230, mailed Apr. 27, 2010, 24 pages.
Non-Final Office Action for U.S. Appl. No. 11/444,119, mailed Mar. 30, 2010, 45 pages.
Notice of Allowance for U.S. Appl. No. 11/479,284, mailed May 13, 2010, 30 pages.
Non-Final Office Action for U.S. Appl. No. 11/496,641, mailed Jul. 29, 2010, 63 pages.
Final Office Action for U.S. Appl. No. 11/583,274, mailed Apr. 7, 2010, 17 pages.
Non-Final Office Action for U.S. Appl. No. 11/583,274, mailed Aug. 5, 2010, 19 pages.
Non-Final Office Action for U.S. Appl. No. 11/810,357, mailed Apr. 26, 2010, 44 pages.
Non-Final Office Action for U.S. Appl. No. 11/871,616, mailed Mar. 9, 2010, 46 pages.
Non-Final Office Action for U.S. Appl. No. 11/413,230, mailed Oct. 16, 2009, 11 pages.
Notice of Allowance for U.S. Appl. No. 11/479,284, mailed Oct. 13, 2010, 19 pages.
Final Office Action for U.S. Appl. No. 11/283,618, mailed Oct. 5, 2010, 26 pages.
Notice of Allowance for U.S. Appl. No. 11/413,230, mailed Oct. 13, 2010, 14 pages.
Office Action for U.S. Appl. No. 11/496,641, mailed on Jun. 7, 2011, 37 pages.
Notice of Allowance for U.S. Appl. No. 11/284,195, mailed on Jun. 27, 2011, 17 pages.
Office Action Response for U.S. Appl. No. 11/810,357, filed Apr. 14, 2011, 16 pages.
Final Office Action for U.S. Appl. No. 11/810,357, mailed Feb. 17, 2011, 38 pages.
Notice of Allowance for U.S. Appl. No. 11/583,274, mailed Apr. 4, 2011, 28 pages.
Non-Final Office Action for U.S. Appl. No. 11/283,618, mailed Mar. 31, 2011, 33 pages.
Notice of Allowance for U.S. Appl. No. 11/284,195, mailed Mar. 4, 2011, 46 pages.
Notice of Allowance for U.S. Appl. No. 11/444,119, mailed Apr. 1, 2011, 50 pages.
Non-Final Office Action Response for U.S. Appl. No. 11/283,618, filed Feb. 17, 2012, 12 pages.
Non-Final Office Action Response for U.S. Appl. No. 11/283,618, filed Aug. 24, 2011, 13 pages.
Final Office Action for U.S. Appl. No. 11/283,618, mailed Sep. 29, 2011, 32 pages.
Notice of Allowance for U.S. Appl. No. 11/444,119, mailed Oct. 5, 2011, 17 pages.
Final Office Action Response for U.S. Appl. No. 11/496,641, filed Mar. 19, 2012, 13 pages.
Final Office Action for U.S. Appl. No. 11/496,641, mailed Oct. 19, 2011, 19 pages.
Non-Final Office Action Response for U.S. Appl. No. 11/496,641, filed Sep. 7, 2011, 13 pages.
Notice of Allowance for U.S. Appl. No. 11/583,274, mailed Dec. 28, 2011, 23 pages.
Non-Final Office Action for U.S. Appl. No. 11/396,299, mailed Jul. 3, 2012, 66 pages.
US 7,801,983, 09/2010, Bornhoevd et al. (withdrawn)

* cited by examiner

DISTRIBUTING RELOCATABLE SERVICES IN MIDDLEWARE FOR SMART ITEMS

TECHNICAL FIELD

This description relates to smart item technologies.

BACKGROUND

Smart item technologies may include, for example, radio-frequency identification (RFID) systems, embedded systems, sensor motes, and/or sensor networks, and may be used, for example, to provide business software applications with fast access to real-world data. For example, smart item technologies may be used support the detection, reading, or writing of RFID tags, as well as to support communication with, and control of, wireless sensor networks and embedded systems. In many instances, smart items may include devices having local processing power, memory, and/or communication capabilities, that are capable of providing data about the device and its properties, or information about a current state or environment of the smart item devices. For example, a product embedded information device (PEID) may include a physical object that is equipped with an embedded computing unit to enable close coupling of real world events to backend information systems. Accordingly, some such devices may be used in the execution of service components of back-end or underlying business applications to collect, process, or transmit business data.

Examples of smart item devices include an RFID tag, which may be passive or active, and which may be attached to an object and used to provide product or handling information related to the object. Other examples of smart item devices includes various sensors, such as, for example, environmental sensors (e.g., a temperature, humidity, or vibration sensor), which may be capable of communicating to form one or more sensor networks. These and other types of smart item devices also may include embedded systems, which may refer generally to any system in which a special-purpose processor and/or program is included, and/or in which the system is encapsulated in the device being controlled or monitored.

Through automatic real-time object tracking, smart item technology may provide businesses with accurate and timely data about business operations, and also may help streamline and automate the business operations. Accordingly, cost reductions and additional business benefits (e.g., increased asset visibility, improved responsiveness, and extended business opportunities) may be obtained.

As an example scenario, a business may need to track a lifecycle of a product. A product's lifecycle may include the phases beginning-of-life (e.g., design, production), middle-of-life (e.g., use, maintenance), and end-of-life (e.g., recycling, disposal). Example business goals related to product lifecycle management may include design improvements, adjustment of production parameters, flexible maintenance planning, and effective recycling. In order to achieve these business goals, the business may need to acquire information relating to the actual behavior and condition of the product. As an example, PEIDs with attached sensors can monitor the usage of products and their environment during their whole lifecycle and make the recorded data available to backend systems, such as maintenance planning, fleet management, and product data management (PDM) systems. Depending, for example, on the number of sensors embedded in the product and the respective sampling rates, large amounts of data may be generated for a single product. This may become even more problematic when multiple products need to be monitored (e.g., in a truck fleet). Furthermore, if products are mobile, they may have only a low bandwidth network or intermittent network connection. Therefore, the transmission of raw field data to backend systems may not be feasible in many cases.

Some systems may use message-oriented middleware to enable communication between smart items such as PEIDs and backend systems. For example, the middleware may be configured to transport data from a PEID to a backend system, where the data may then be processed. In the area of wireless sensor networks, for example, middleware may be used for connection of the wireless sensor nodes of the wireless sensor network, either among the nodes themselves or to the backend application for further evaluation and processing of the data. In this context, there may exist intermittent connections, for example, due to movement of the nodes that enable the communication. Thus, data or results may either be lost, or may need to be stored on the nodes.

For some smart items for which very large amounts of real-time data need to be processed, for example, the storage capacity and/or the processing capacity of the nodes may be insufficient to handle the data, and thus dependability or integrity of results may be compromised. For example, while recording real-world data of products using PEIDs enables more accurate analysis, it also may pose the problem of creating large amounts of data by periodic recording from sensors (e.g., sampling). Depending, for example, on the type of sensor and the data resolution required for a particular application, a sampling frequency may be defined. For example, an outside temperature sensor may be read in intervals of a predefined number of minutes, as temperature variations may be expected to occur gradually, in a range of minutes. In contrast, an acceleration sensor which may be used to detect vibration patterns may be read a few hundred times per second, as otherwise, relevant vibrations may not be detected. Assuming that for each recording a 4 Byte numeric value is stored, the temperature sensor may create 5.625 KBytes of raw data per day (i.e., 1 sample per minute), whereas the acceleration sensor may create 33750 KBytes of raw data per day (i.e., 100 samples per second).

Since PEIDs may have limited memory capacity, they may not be able to store the recorded data for long time periods. Therefore, the data may need to be transmitted to another system for analysis or be processed locally with the results being sent to backend systems, if needed. However, performing all necessary analysis on the product and transmitting only the result may not be feasible, as a PEID may have very limited resources and/or power supply and/or connectivity. Moreover, for example, some data processing steps may require additional input from secondary databases or other products, which may not be available on the individual product.

SUMMARY

According to one general aspect, a composite service may be determined, the composite service associated with an analysis of data generated by one or more sensors, the composite service associated with service metadata and including a first component service and a second component service having an ordering of execution for the analysis of the data based on the service metadata. The first component service may be deployed to a first service execution environment located at a device layer, the first component service configured to generate a first result. The second component service may be deployed to a second service execution environment located at a device handling layer, the second component service configured to generate a second result based on the first result. A request for an analysis result associated with the analysis of data generated by the one or more sensors and the composite service may be received. The composite service may be invoked based on an entry point of the composite service. The analysis result may be received, wherein the analysis result is based on the second result generated by the second component service.

According to another general aspect, a system includes a middleware layer including a request handling layer and a device handling layer, the middleware layer in communication with an application and a device layer including one or more devices. The request handling layer includes a service repository that is configured to store at least one composite service in association with service metadata describing an ordering of execution of a first component service and a second component service of the composite service. The request handling layer further includes a request handler that is configured to receive from the application a request for an analysis result associated with an analysis of data generated by the one or more devices during execution of the composite service, and a service manager that is configured to determine device metadata associated with each of the devices, the service manager being further configured to initiate deployment of the first component service to a first service execution environment located at the device layer and to initiate deployment of the second component service to a second service execution environment located at the device handling layer based on the service metadata and the device metadata.

According to another general aspect, a service manager is configured to determine a composite service associated with an analysis of data generated by one or more sensors, the composite service associated with service metadata and including a first component service and a second component service having an ordering of execution for the analysis of the data. The service manager is further configured to initiate deployment of the first component service to a first service execution environment located at a device layer, the first component service configured to generate a first result, and to initiate deployment of the second component service to a second service execution environment located at a device handling layer, the second component service configured to generate a second result based on the first result. The service manager is further configured to receive a request for an analysis result associated with the analysis of data generated by the one or more sensors and the composite service, and to invoke the composite service based on an entry point of the composite service to obtain the analysis result, wherein the analysis result is based on the second result generated by the second component service.

The details of one or more implementations are set forth in the accompanying drawings and the description below. Other features will be apparent from the description and drawings, and from the claims.

DETAILED DESCRIPTION

Figure 1:
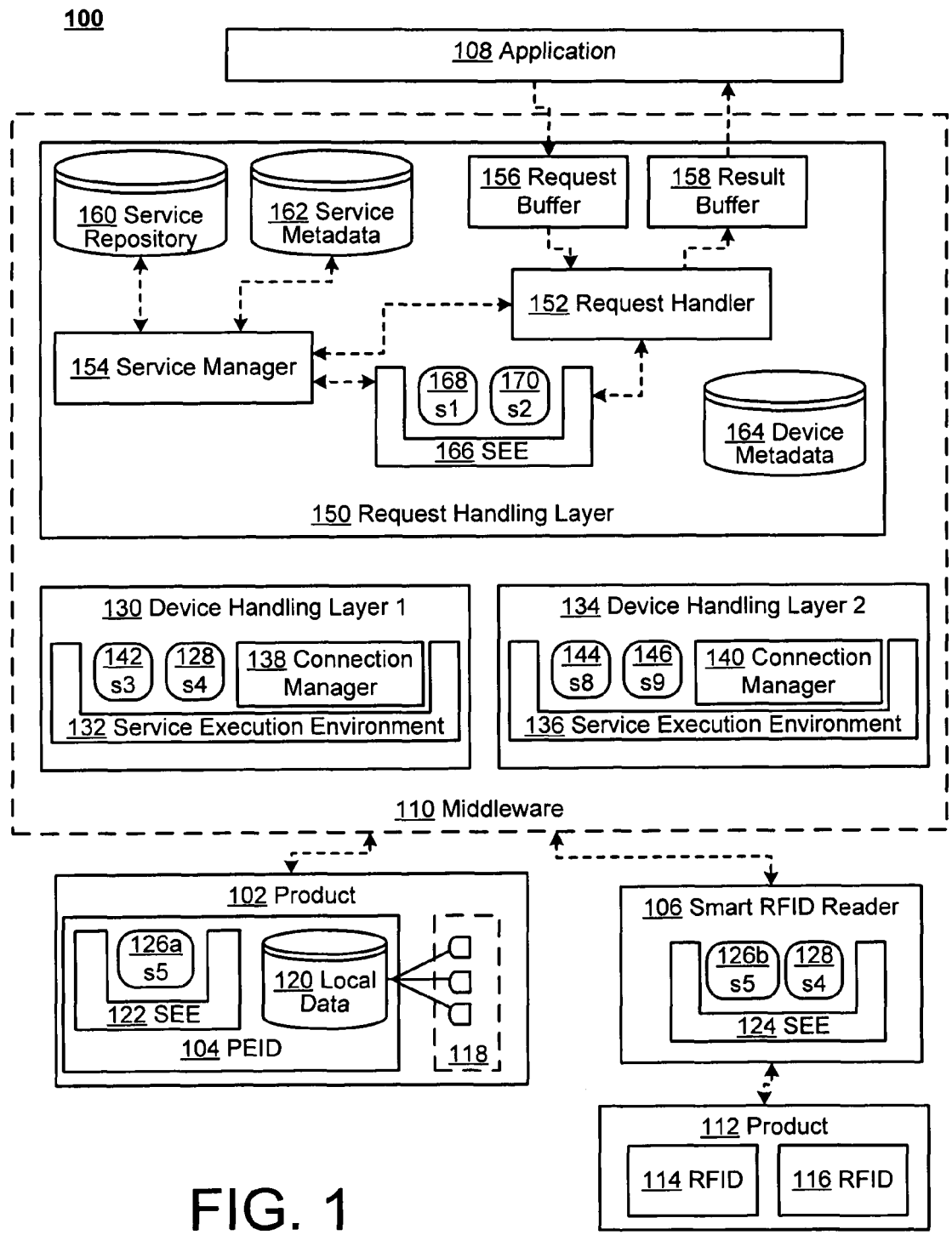
FIG. 1 is a block diagram of an example system for processing data obtained by smart item devices.

FIG. 1 is a block diagram of an example system 100 for processing data obtained by smart item devices. In the example of FIG. 1, various smart item devices, for example, a product that includes a product embedded information device (PEID) 104 and a smart radio-frequency identification (RFID) reader 106, provide real-world data to one or more applications 108 in a timely and accurate manner, using middleware 110 to preprocess data received from the smart item devices. For example, the smart RFID reader 106 may read objects having an RFID tag, for example, a product 112 having RFID tags 114 and 116. For example, the product 112 may include a portable computer having the RFID tag 114 attached to its chassis and the RFID tag 116 attached to a mini-mouse. The smart RFID reader 106 may, for example, thus read, or sense the RFID tags 114 and 116 as a person carrying the portable computer carries the chassis and the mouse past a station having the smart RFID reader attached thereto. As another example, the PEID 104 may receive data from sensors 118 that may be stored in local data storage 120. For example, the sensors 118 may sense temperature, vibration, and/or pressure relating to the product 102. For example, the product 102 may include an engine having the PEID 104 attached thereto, and the sensors 118 may be configured, for example, to detect temperature, humidity, and/or vibration in close proximity to the engine.

In FIG. 1, each of the PEID 104 and the smart RFID reader 106 may include a central processing unit (CPU) and a memory (not shown). Further, the PEID 104 may include a service execution environment (SEE) 122 and the smart RFID reader 106 may include a service execution environment (SEE) 124. Thus, the PEID 104 and the smart RFID reader 106 should be understood to be capable of various levels of computing capabilities, including, for example, processing or transmitting sensed data. A service execution environment may include a container, in which services may be executed in an adaptable and flexible manner. Thus, the service execution environment 122 and the service execution environment 124 may be used for service relocation, for example, for relocating services that may pre-process raw data received by the smart item devices so that only pre-processed results may be sent to the application 108, instead of requiring all raw data to be transmitted to the application 108 for processing at the backend system.

Thus, example services that may be relocated to the service execution environment 122 and the service execution environment 124 may be configured to calculate, for example, a linear regression of data values, a moving average of data values, threshold monitoring, a notification, or a number of occurrences of an event or item. As an example, the service execution environments 122, 124 may be implemented, for example, utilizing an Open Services Gateway initiative (OSGi) service platform. Such an OSGi service platform may provide component management capabilities for dynamically deployable applications, libraries, and services. Using a platform such as OSGi, services may easily be deployed, started, stopped, and removed from the service execution environment. Thus, services, applications and service-oriented Applications Programming Interfaces (APIs) may be, for example, remotely downloaded to, upgraded in, or removed from mobile devices. Moreover, a unified service execution environment may be embedded in middleware nodes, PEIDs, and smart RFID readers to enable a flexible distribution of services. Preferably, services may be deployed and executed on PEIDs and other device layer entities.

Thus, the PEID 104 and the smart RFID reader 106 may be configured to collect, process, filter, aggregate, or transmit data that may be useful to the application 108, for example, a business data processing application. For example, the application 108 may include inventory management, supply chain management, retail store management, warehouse management, and any other process or application that may be used to execute business processes with respect to real-world objects, where such realworld objects may include, for example, products for sale, pallets or other shipment elements, patients, or manufacturing materials/equipment. By tracking and analyzing such real-world objects, the application 108 may be used, for example, to determine inventory levels, set pricing levels, evaluate marketing strategies, evaluate manufacturing or production technologies, reduce theft, or maintain safety. The application 108 may also be used for product lifecycle management (PLM), for example, to determine uses, locations, and conditions of products over time.

By including pre-processing capabilities at smart items such as the PEID 104 and the smart RFID reader 106, processing may be performed very early in the data-collection process(es), so that a burden placed on the application 108 may be reduced or eliminated. Further, the pre-processing may lessen the amount of data to be transmitted from the devices to the middleware layer. For example, the application 108 may be located at a corporate headquarters, and the PEID 104 and the smart RFID reader 106 may be dispersed across a large geographical region connected by a wide area network, which may be connected via wireless connections. As such, for example, the application 108 may only require certain sub-sets or characterizations of data collected by the PEID 104 and the smart RFID reader 106, and may not need or want all collected, raw data.

In some implementations, the application 108 may include compound or composite applications that are made from reusable software components or services that are designed to perform some well-defined task(s). Also, in these or other implementations, the application 108 may include legacy applications that may not easily communicate with data-collection devices (or with other business data processing systems), and, in such cases, services or service components may be provided as interfaces between the legacy applications and the data collection devices and/or other systems. The system 100 may enable these and other applications and services to be deployed directly on the PEID 104 and the smart RFID reader 106, for example, via the service execution environments 122 and 124, so that, for example, services may be run on the devices (e.g., data may be collected and/or processed) in a timely, efficient, reliable, automated, cost-effective, and scalable manner. Thus, for example, complex business processes, or composite services, may be decomposed into lightweight, portable individual services and may be deployed at different devices. For example, a service s5 126 (e.g., service s5 126a and service s5 126b) may be deployed and executed in the SEE 122 of the PEID 104 and in the SEE 124 of the smart RFID reader 106. As an example, a composite service may need a count of the number of readings per hour performed by a device such as the PEID 104 or the smart RFID reader 106. The service s5 126, for example, may be configured to calculate such a count for each of the PEID 104 and smart RFID reader 106. The pre-processed result may then be used, for example, by other decomposed services of the composite service. As another example, a service s4 128 may be deployed and executed in the SEE 124 of the smart RFID reader 106. However, the PEID 104 and the smart RFID reader 106, for example, may not include sufficient processing or storage capabilities to handle all such decomposed services that the application 108 may require for processing data.

The middleware layer 110 may include a device handling layer 1 130 that may include a service execution environment 132, and a device handling layer 2 134 that may include a service execution environment 136. Each of the device handling layer 1 130 and the device handling layer 2 134 may be configured to manage the devices at the device level, for example the PEID 104 and the smart RFID reader 106. As discussed previously, the service execution environments 132 and 136 may each include a container, in which services may be executed in an adaptable and flexible manner. Thus, services may flexibly and adaptably be deployed and executed in each of the service execution environments 132 and 136. As shown in the example system 100 of FIG. 1, the service execution environments 132 and 136 may each include a connection manager 138 and 140, respectively. The connection managers 138 and 140, for example, may be configured to manage connections, for example, wireless connections, between the middleware 110 and the devices such as the PEID 104 and the smart RFID reader 106. Thus, if a connection is intermittent, for example, due to travel by a device, or due to noise interference in the signal, the connection managers 138 and 140 may be configured to attempt to maintain connectivity with the devices, even if the connection is intermittent, or to report breaks in connectivity to the application 108. Therefore, transmission of data from the devices may be sporadic.

As shown in FIG. 1, the service execution environments 132 and 136 may include services s3 142, s4 128, s8 144, and s9 146, which may be adaptively and flexibly located and executed on each of the device handling layers 130 and 134. Thus, for example, the service s5 126a may be deployed to the PEID 104 to obtain a series of temperatures from the sensors 108 via the local data storage 120, and to calculate an average temperature value for a predetermined number of temperature values. The service s4 128 may be deployed to the device handling layer 1 130, for example, to obtain the resulting average temperature values from the PEID 104, and, for example, to calculate a slope for successive values. The service s3 142 may then obtain the resulting slope and compare the slope value to a predetermined threshold value and generate an alarm message to be sent to the request handling layer 150 if the slope value exceeds the threshold value. The processing may be achieved by initiating execution of the service s3 142, which may in turn initiate execution of the service s4 128, which may in turn initiate execution of the service s5 126a, for example, via a service call mechanism that allows passing parameter values among the services. The pre-processed result values are returned by each of the services in succession by the ordering of execution of the called services.

Thus, a significant amount of pre-processing of the data from the sensors 118 may be performed, for example, first at the PEID 104 at the device level, and then at the device handling layer 1 130 in the middleware 110, thus easing the processing burden on the application 108 that may need to receive such alarm information regarding temperature levels of the product 102. Furthermore, by pre-processing the temperature values as an average value at the PEID 104, only the average value needs to be sent from the device layer to the middleware 110, thus significantly decreasing the amount of data sent from the device layer to the middleware layer 110, and on to the application 108 that may be located at a backend system.

The request handling layer 150 may include a request handler 152 and a service manager 154. The request handler 152 may be configured to receive requests for information, for example, requests for analysis results related to PEIDs or other devices, from backend systems or other applications such as the application 108. In one aspect, the request handler 152 may operate as a request/response mechanism. However, the request handler 152 may be extended to provide subscriptions on information requests so that the requesting application 108 may receive subscribed information triggered, for example, by changes in values or in regular predefined intervals. For example, the application 108 may request analysis results regarding the temperature of the product 102 whenever the temperature fluctuates more than a predetermined amount, or every minute. For example, the application may request an alert if the temperature of the product 102 increases more than 10 degrees in one minute or less.

The request handler 152 may include a request buffer 156 configured to store requests received from the application 108 and a result buffer 158 configured to store results from the request handler 152 for the application 108, for example, to enable communication to applications and PEIDs which have only intermittent connectivity. The requests from the application 108 may include at least a product identifier that identifies a specific product, for example, the product 102, and an InfoItemID value identifying the request and servicing required to satisfy the request. For example, if the application 108 requests an update on the temperature of an engine, for example, the product 102, then the request may include a product identifier for the product 102 and an InfoItem specifying, for example, a service such as "Current engine temperature."

The service manager 154 may be configured to handle service tasks related to the management of services, which may include registering and unregistering of services, deploying services to other nodes, loading them into service execution environments, and support for service composition. The service manager 154 may communicate with a service repository 160 and service metadata storage 162, and a service injector (not shown) to accomplish these tasks.

The service repository 160 may be configured to store all available services that may be deployed and executed in the system 100, including, for example, an executable for each service. Additionally, a meta description of each service, including the hardware requirements and other properties, may be stored in the service metadata storage 162.

Composite services, which may include combinations of atomic services for application specific purposes, may be stored in the service repository 160 as well. The service metadata storage 162 may maintain a list of InfoItems (e.g., information entities) that may be accessed from a PEID as identifying information or attribute information relating to the PEID (e.g., PEID 104). Such InfoItems, for example, may include simple information from a PEID such as a manufacturing date and total mileage of the product 102, or information that is derived by analysis, for example, average mileage per day or engine temperature trend during operation. The InfoItems provided, for example, by the PEID 104, may be retrieved from the PEID 104 when the product 102 is registered in the system 100. InfoItems that are derived from other information by pre-processing in the middleware 110 may be registered using administrative tools (not shown).

In some examples, the same service may be implemented for a plurality of development platforms, e.g., may be implemented for known development platforms that are based on the C/C++ programming language or the Java programming language. By providing such a diversity of development platforms, a given service may be deployable to a wider range or type of devices that may be in use. Information about the development platform(s) of the service in question may be included as a type of the service metadata 162, along with, for example, any of the various service requirements or preferences for operating the service The service injector may be used to install and start deployed services (e.g., the service s5 126a) on the SEE 122 of the PEID 104. The service injector, further, may more generally be used to manage a life cycle of the service(s), e.g., by performing service updates or stopping the service when necessary. Thus, one task of the service injector may include transferring concrete service code (e.g., an appropriate one of the service executable(s) of the service repository 160) to a selected device(s). Thus, the service injector receives and installs the kind of code in question. Such an install component as the service injector may be installed on the device-side as either a single standalone software component, or may cooperate with other installation components in order to distribute the service executables of the service repository 160. In the latter case, for example, if the all selected devices for a requested service installation may not be reached, for example, due to a lapse in connection of a device, then, for example, a list may be maintained of currently unreachable devices that are intended to receive a service so that when they become reachable, the service injector may be alerted to accomplish the installation. After installing, for example, the service s5 126a, the service s5 126a may be kept in an inactive state until the service injector sends a start-up signal to change the service to an active state. In a similar way, the service injector may be used to organize the updating and stopping of services.

The request handling layer 150 may further include device metadata storage 164 that includes information relating to devices, for example smart item devices such as the PEID 104 and the smart RFID reader 106 at the device layer and to devices at the device handling layers 130 and 134. Such information may include manufacturer information, manufacturing date, battery type, battery usage, battery cost, battery capacity, CPU type, CPU utilization, etc. that may be utilized, for example, by the service manager 154, in combination with the service metadata 162, in determinations for deployment of services from the service repository 160, for example, to service execution environments 122, 124, 132, 136, and a service execution environment (SEE) 166 that may, for example, receive deployed services sl 168 and s2 170 for execution at the request handling layer 150. The device metadata 164 may include, for example, a device description, a software description, a hardware description, and a device status. For example, the device description may include a device name, identifier, or type, or may include vendor information including a vendor name or vendor website. The software description may include an operating system description, including version and/or vendor, or may include a description of services running or allowed to run on the device platform. The hardware description may include information about attributes of a CPU of a device (e.g., name or speed), a memory of a device (e.g., total and/or free amount of memory), or connection capabilities (e.g., connection speed or connection type) of the device(s). The device status may include more volatile information, including a device location, current CPU usage, or remaining power or memory. Of course, other device aspects or information may be included in the device metadata 163, as would be apparent. For example, the device metadata 164 may include information about other devices, such as where the device 106 includes an RFID reader, and the device metadata 164 may include a description of types of RFID tags 114, 116 that may be read and/or written to by the smart RFID reader 106.

Further, the service metadata 162 may include a service behavior description, technical constraints of the service, or information regarding input, output, preconditions, or effects (IOPE) of the service. For example, technical constraints may include a required CPU type or speed, an amount of (free) memory that is needed, a type or speed of connection that is required or preferred, an operating system version/name/description, or a type or status of a battery or other device power source(s).

Thus, as with the device metadata 164, distinctions may be made between static and dynamic service requirements, such as hardware requirements. For example, a static value such as a total memory or maximum processing speed may be included, along with dynamic values such as available memory/processing/power and/or a number or type of other services that may be allowed to concurrently run on a device together with the service(s) in question, at an execution time of the service(s).

Construction and use of the service metadata 162 may differ depending on whether the service(s) are considered to be a compound (or composite) service and/or an atomic service. In this regard, an atomic service may refer to a discrete service that runs on a single device, while a compound or composite service may refer to a higher-level service that includes and combines one or more atomic services. For example, a compound service may be deployed in order to provide a cumulative or aggregated function(s), and an atomic service may refer to services that are deployed to individual devices 102, 106. For example, the product 102 may include temperature sensors 118 dispersed in a defined area to determine a temperature distribution or gradient in the area, in which case the PEID 104 may execute a temperature-collection service (e.g., the service s5 126*a* on the PEID 104), while a compound service s4 128 at the device handling layer 1 130 may aggregate the temperature data of several devices and determine information about the temperature distribution or gradient. Thus, for example, it should be understood that part of the service metadata 162 for a compound or composite service may include information regarding atomic services that comprise the compound or composite service.

As another example, a composite service may include multiple component services. An initiation of execution of the composite service may include a call to the composite service, which may result in a call to one of the component services, which may result further in a call to another component service. Each of the services may receive and/or return parameter values, and the calls to the services may be initiated via an entry point of execution of the respective service. For example, the request handler 152 may receive a request from the application 108 for information relating to, for example, a product such as the product 102.

As an example, the product 102 may include an engine and the request may include a request for a notification whenever the engine temperature rises too fast. Thus, servicing the request may be fulfilled by executing a composite service "temperature monitor" which may include at least four component services such as:

(1) a data collector service configured to read from a temperature sensor at a predetermined interval and generate a time series;
(2) a trend service configured to receive the time series, perform a linear regression on it, and return the slope;
(3) a threshold service configured to compare the slope to a predetermined threshold, and return a value of true if the slope exceeds the threshold and return a value of false otherwise; and
(4) a message service configured to generate a temperature warning message that is sent as a result to the application 108, if a value of true is returned by the threshold service.

Each of the component services may be implemented as lightweight, relocatable executables that may be easily deployed to various service execution environments for execution and interoperability with other services. Thus, for example, the data collector service may be configured as an executable and stored in the service repository 160 with corresponding descriptive metadata (e.g., description of functionality and input and output parameters) stored in the service metadata storage 162. Similarly, the trend service, the threshold service, and the message service may each be configured as an executable and stored in the service repository 160 with corresponding descriptive metadata (e.g., description of functionality and input and output parameters) stored in the service metadata storage 162. Further, the information describing the composite service "temperature monitor" may be stored in the service metadata storage 162, for example, the composite service name, indicators of the component services, and an indication of an ordering of execution of the component services to achieve the desired result of the processing.

Thus, as an example, the application 108 may send a request for a "temperature monitor" for the product 102 to the request handler 152. As discussed previously, the request may include information specific to the specified product 102, as well as an InfoItem identifying the requested service. If the product 102 is currently not connected to the middleware 110, as may be determined, for example, by the connection manager 138, the request may be stored in the request buffer 156 until the product 102 is connected. For example, the connection manger 138 may be sent a request to transmit a "connected" indicator to the request handler 152 when the product 102 is connected to the device handling layer 1 130.

When it is determined that the product 102 is connected, the request handler 152 may send the "temperature monitor" request to the service manager 154, which may access the service metadata 162 to obtain information regarding the composite service "temperature monitor." The service manager 154 may determine that the composite service includes at least four component services s5 126 (e.g., the data collector service), s4 128 (e.g., the trend service), s3 142 (e.g., the threshold service), and s2 170 (e.g., the message service), wherein an executable for each service may be included in the service repository 160 and associated metadata may be included in the service metadata 162. Based on the composite service metadata, the service manager 154 may further determine an entry point for processing, and an ordering of execution and processing of data for the component services s5 126, s4 128, s3 142, and s2 128, as well as information relating to the parameters utilized in executing the services and passing and returning items.

The service manager 154 may then access the device metadata 164 to obtain device information to determine how much of the component service processing may be deployed and executed, for example, at the product 102 (e.g., at the SEE 122). Since the example ordering of execution may indicate that service s5 126 needs to be performed to process the data from the sensors 118 before the service s4 128 may process a result of that processing, the service manager 154 may determine that the component service s5 126*a* may be deployed to the SEE 122 for execution at the product 102 (e.g., an engine needing temperature monitoring). As the service s4 128 would conveniently reduce the further transmission of data to the application 108, as well as, for example, reducing the amount of processing of data at the backend system of the application 108, the service manager 154 may determine, based on the service metadata 162 and the device metadata 164, whether the service s4 128 may also be deployed and executed at the product 102.

If the SEE 122 may not conveniently accommodate the service s4 128, then the service manager 154 may determine, for example, that the SEE 132 of the device handling layer 1 130 may be used for deployment and execution of the next (e.g., by execution ordering) services s4 128 and s3 142. The service manager may then determine that the service s2 170 may be deployed and executed at the SEE 166 at the request handling layer 150, such that the request manager 152 may initiate execution of the composite service by initiating execution at an entry point located in the service s2 170, for example, resulting in a call from the service s2 170 to the threshold service (e.g., s3 142), such that, if the threshold service (e.g., s3 142) returns a result of true, then the service s2 170 may generate a temperature warning message to be returned to the application 108. As deployed, the services s5 126*a*, s4 128, s3 142, and s2 170 may then enable pre-processing of the raw data of the sensors 118 at the device level, with a preprocessed result to be returned to the middleware layer 110 for further processing, with a single analysis result of that processing (e.g., a warning message) returned to the application 108. Thus, a significant decrease in transmission and processing of data is achieved at the application 108 level, with more processing achieved at the lower levels such as the device layer and the middleware layer 110. Moreover, the component services may be implemented as lightweight, reusable, and relocatable services that may be dynamically deployed and relocated as conditions change in the system 100.

Furthermore, the service metadata 162 may include a list of the component services s2 170, s3 142, s4 128, and s5 126 associated with an InfoItem associated with the composite service "temperature monitor," and metadata for each of the component services s2 170, s3 142, s4 128, and s5 126, which may be stored in the service repository 162 with executables for each of the component services, may include information regarding entry points for each of the component services, as well as information regarding parameters that may be expected to be passed in to each component service or returned as a result of execution of the component services. For example, the service s4 128, which may include the trend service discussed previously, may have associated with it a service executable and metadata indicating that the service s4 128 inputs a parameter including a time series, and outputs a parameter including a slope that results from executing a linear regression on the slope.

Figure 2:
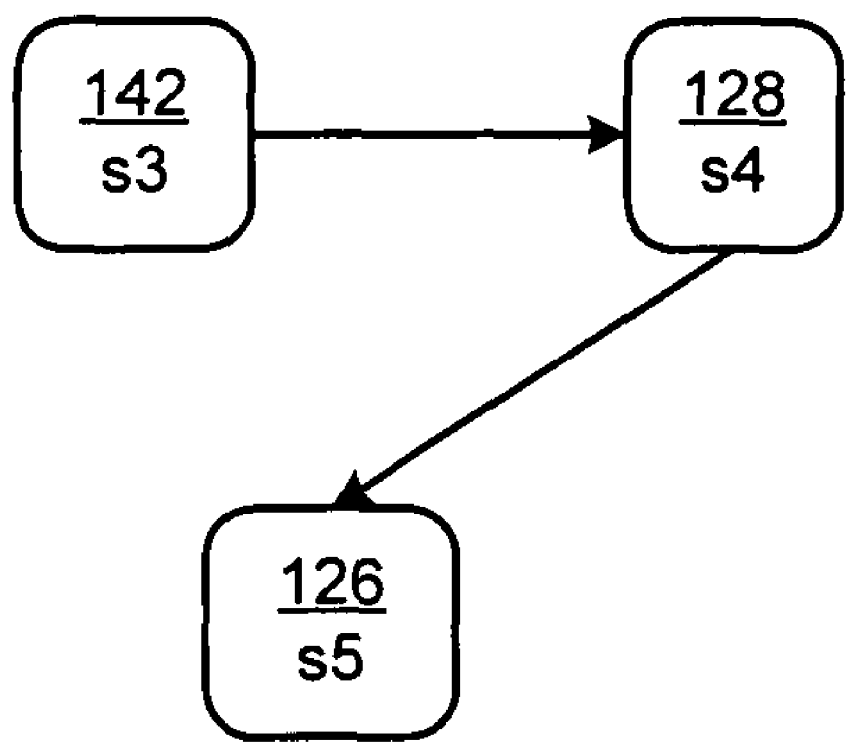
FIG. 2 is a block diagram illustrating an example composition of services.

FIG. 2 is a block diagram illustrating an example composition of services 200. As discussed previously, a composite service may include multiple component services such that the composite service may be initiated by a call including an initiation of execution of instructions at a defined entry point of the composite service. The call to the composite service may include a transmission of indicators of parameters and/or parameter values to enable exchange of data and results among the services. The component services may be installed. The component services may have an ordering defined by an ordering of execution of the services as discussed previously, for example, with regard to the composite service "temperature monitor." As shown in FIG. 2, the component service s3 142 (e.g., the threshold service) may initiate execution of the component service s4 128 (e.g., the trend service), which may initiate execution of the component service s5 126*a* (e.g., the data collector service), which, for example, may be deployed to the SEE 122 of the PEID 104 at the device level in order to reduce the amount of data transmitted to the backend system of the application 108, as well as to reduce the amount of processing of data at the backend system.

Further, the component service s5 126*a* may return a result of its data collector processing (e.g., a time series) to the component service s4 128, which, for example, may be deployed to the SEE 132 of the device handling layer 1 130 of the middleware layer 110. The component service s4 128 may then return a result of its trend processing on the time series (e.g., a slope) to the component service s3 142, which, for example, may also be deployed to the SEE 132 of the device handling layer 1 130 of the middleware layer 110. The component service s3 142 may return a result of its threshold processing on the slope (e.g., a boolean value of true or false) to a service that may have called the component service s3 142, for example, the service s2 170 (e.g., a message service), which may be deployed to the SEE 166 at the request handling layer 150, to return a warning or no message in response to a call to the composite service "temperature monitor." This analysis result may then be placed in the result buffer 158 by the request handler 152, and the application 108 may be informed of its availability for retrieval from the result buffer 158.

Thus, the request for the analysis result may, for example, be decomposed into a deployment of component services, placed according to their ordering of execution such that processing of raw data is performed at the device level, or close to the device level, with intermediate results to be processed by passing pre-processed results up from the device layer to the middleware 110, via device handling layers 130, 134, and on up to the request handling layer 150. Thus, the processing of the raw data of the sensors 118 may be started at the edge devices (e.g., PEID 104), with progressively further preprocessing of intermediate results performed at service execution environments up through the layers until the application 108 is enabled to receive an analysis result that is potentially fully processed for use, for example, in product lifecycle management.

It is to be understood that while each of the services s3 142, s4 128, and s5 126 is illustrated in FIG. 2 as communicating only with a single called component service, any of the services may call more than one called service (i.e., one-to-many), and multiple component services may also call a single service (i.e., many-to-one).

Figure 3:
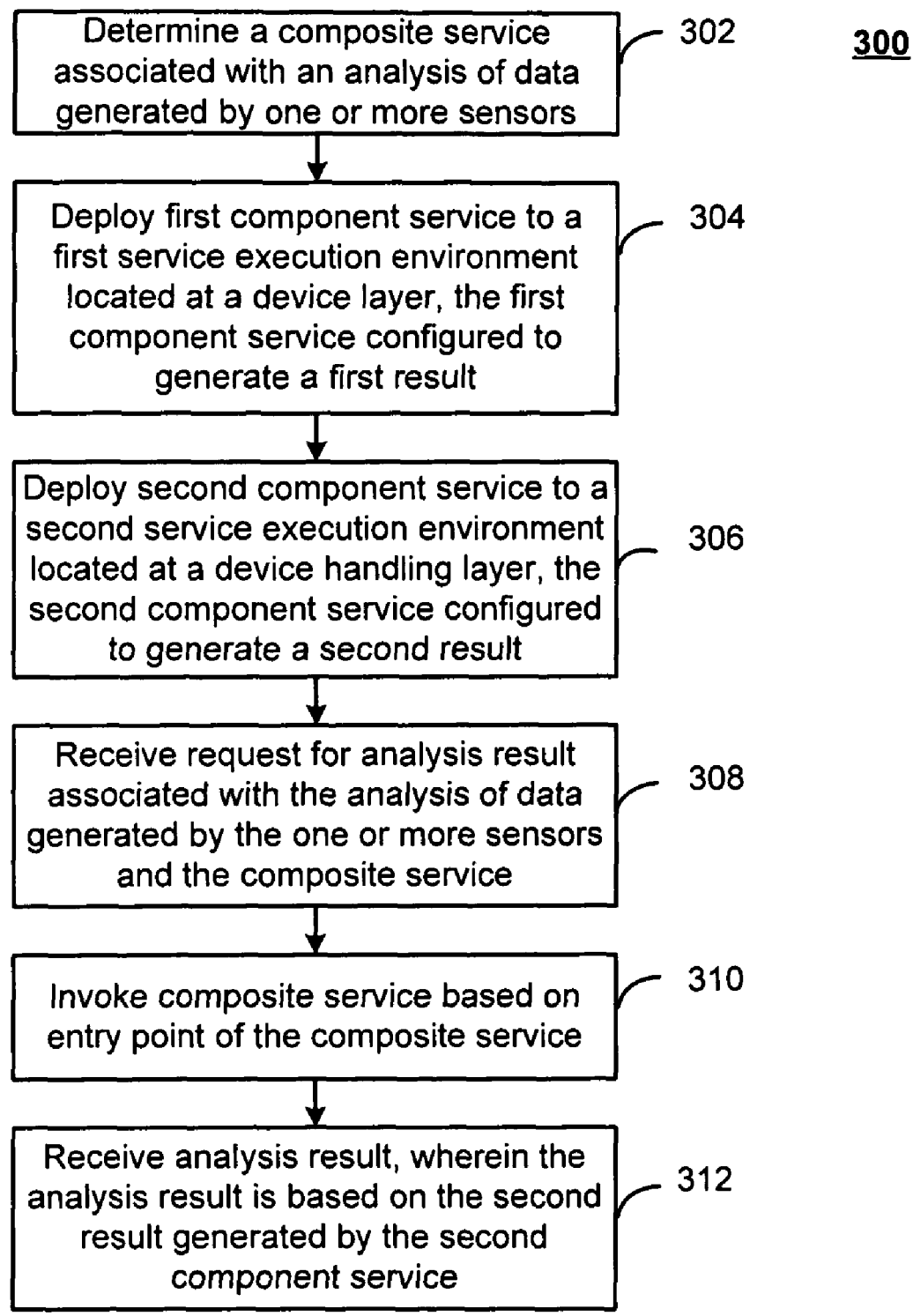
FIG. 3 is a flowchart illustrating example operations of the system of FIG. 1.

FIG. 3 is a flowchart illustrating example operations of the system of FIG. 1. Specifically, FIG. 3 is a flowchart illustrating an example deployment of a composite service and processing of a request from the application 108 of the system 100.

In the example of FIG. 3, a composite service may be determined that is associated with an analysis of data generated by one or more sensors (302). Thus, the composite service "temperature monitor" may be determined to include at least four component services as discussed previously with regard to FIGS. 1 and 2. For example, the service manager 154 may then access the service metadata 162 to determine a list of the component services associated with the composite service associated with an InfoItem, for example, component services s2 170, s3 142, s4 128, and s5 126. The service manager 154 may then access the service repository 160 to obtain service executables for each of the component services, as well as metadata indicating, for example, the ordering of execution of the component services, entry points for execution of each of the component services, and information regarding parameters to be passed among the component services s2 170, s3 142, s4 128, and s5 126.

If it is desired to implement a "temperature monitor" with regard to, for example, the product 102, the service manager 154 may also access the device metadata 164 to obtain information regarding, for example, the product 102 and the PEID 104, as well as the SEE 122 and the local data storage 120. After analysis of service metadata 162 and device metadata 164 associated with the product 102, the service manager 154 may further access the device metadata 164 for information regarding the device handling layer 1 130 and the SEE 166 to determine a deployment of the component services s2 170, s3 142, s4 128, and s5 126. The service manager 154 may then deploy a first component service to a first service execution environment located at a device layer, the first component service configured to generate a first result (304). For example, the service manager 154 may deploy, via the service injector, the component service s5 126a to the SEE 122 at the device layer, the component service s5 126a configured to generate a time series as a first result, as discussed previously with regard to FIG. 1.

The service manager 154 may then deploy a second component service to a second service execution environment located at a device handling layer, the second component service configured to generate a second result (306) based on the first result. For example, the service manager 154 may deploy, via the service injector, the component service s4 128 to the SEE 132 at the device handling layer 1 130, the component service s4 128 configured to generate a boolean value of true or false as a second result based on the time series, as discussed previously with regard to FIG. 1. Similarly, the component services s3 142 and s2 170 may be deployed to the SEE 132 of the device handling layer 1 130 and to the SEE 166 of the request handling layer 150, respectively, as shown in FIG. 1.

A request may received for an analysis result associated with the analysis of data generated by the one or more sensors and the composite service (308). For example, the request handler 152 may receive a request from the application 108 for an analysis result relating to, for example, a specified product such as the product 102. As an example, the product 102 may include an engine and the request may include a request for a notification whenever the engine temperature rises too fast. The request may also specify an InfoItem that identifies the type of analysis result that is desired, for example, an analysis result including a "temperature monitor" for the product 102.

After verifying that the composite service has been deployed as desired, for example, by accessing the service metadata 162 and the device metadata 164 to verify that the "temperature monitor" composite service has been deployed with respect to the product 102, the composite service may then be invoked based on an entry point of the composite service (310), as discussed previously with regard to FIG. 1. Thus, for example, the service manager 154 may invoke the composite service "temperature monitor" via a call to the entry point included in the service metadata 162 associated with the "temperature monitor," including any parameters indicated for the "temperature monitor" by the service metadata 162. The invocation of the composite service "temperature monitor" may then cause execution of all of the component services of the "temperature monitor" composite service, for example, the component services s2 170, s3 142, s4 128, and s5 126a.

The analysis result may then be received, wherein the analysis result is based on the second result generated by the second component service (312). Thus, as discussed previously, the analysis result, for example, a value of true or false for a temperature warning, may be received from the component service s2 170, to be placed in the result buffer 158 for the application 108. As discussed previously, for example, the temperature warning may be based on the Boolean value returned by the threshold service (e.g., component service s3 142), which may be based on the slope returned to the threshold service by the trend service (e.g., the component service s4 128).

Thus, the pre-processing is flexibly and dynamically distributed via lightweight component service executables such that, for example, the raw data generated by the sensors 118 is pre-processed at the device level, with less data needing to be transmitted from the PEID 102, as well as including further processing of the data in the device handling layer of the middleware, before intermediate results are passed up to the request handling layer 150, with a fully processed result returned to the backend application 108.

Figure 4:
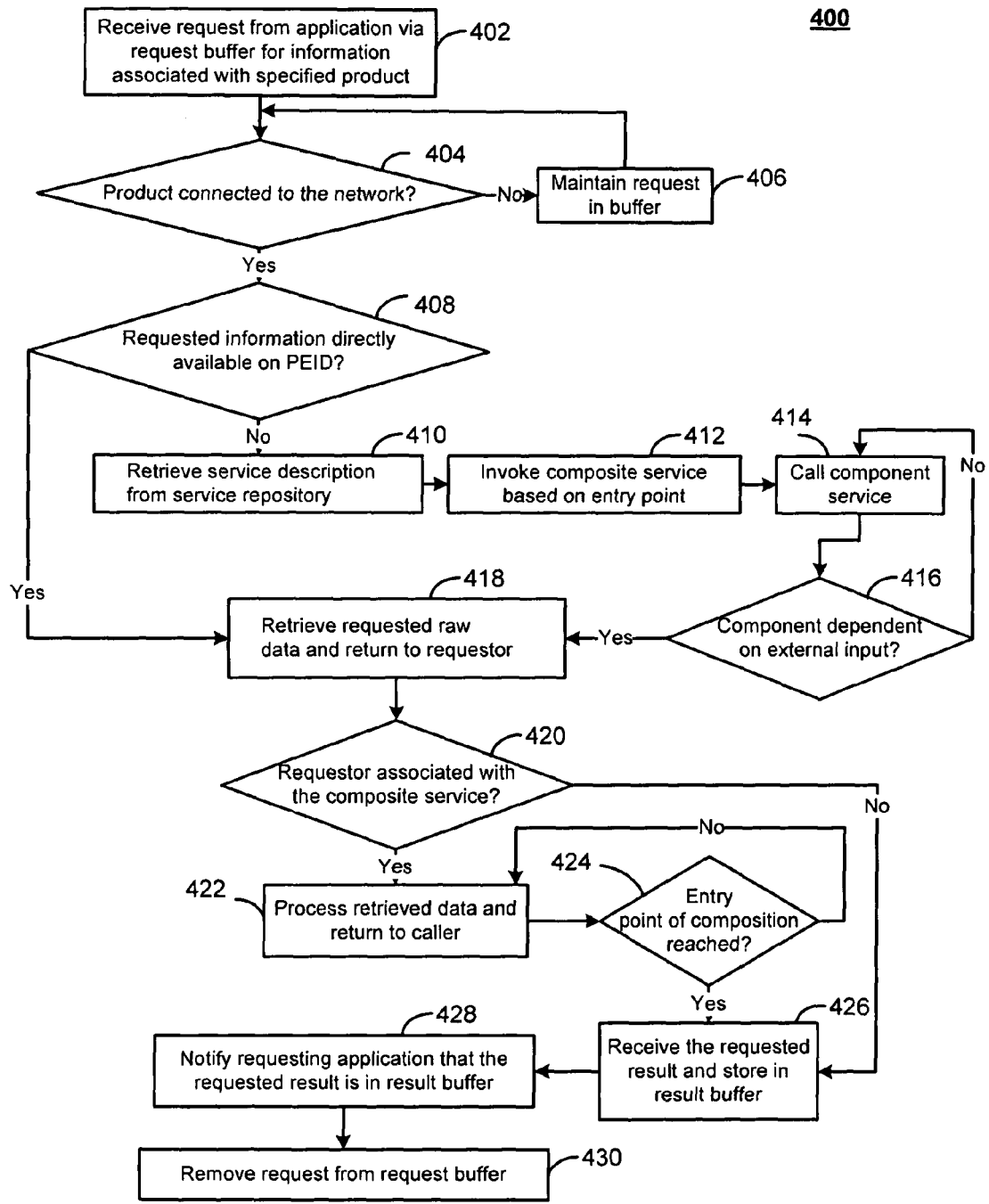
FIG. 4 is a flowchart illustrating example operations of the system of FIG. 1 for product lifecycle management.
Figure 5:
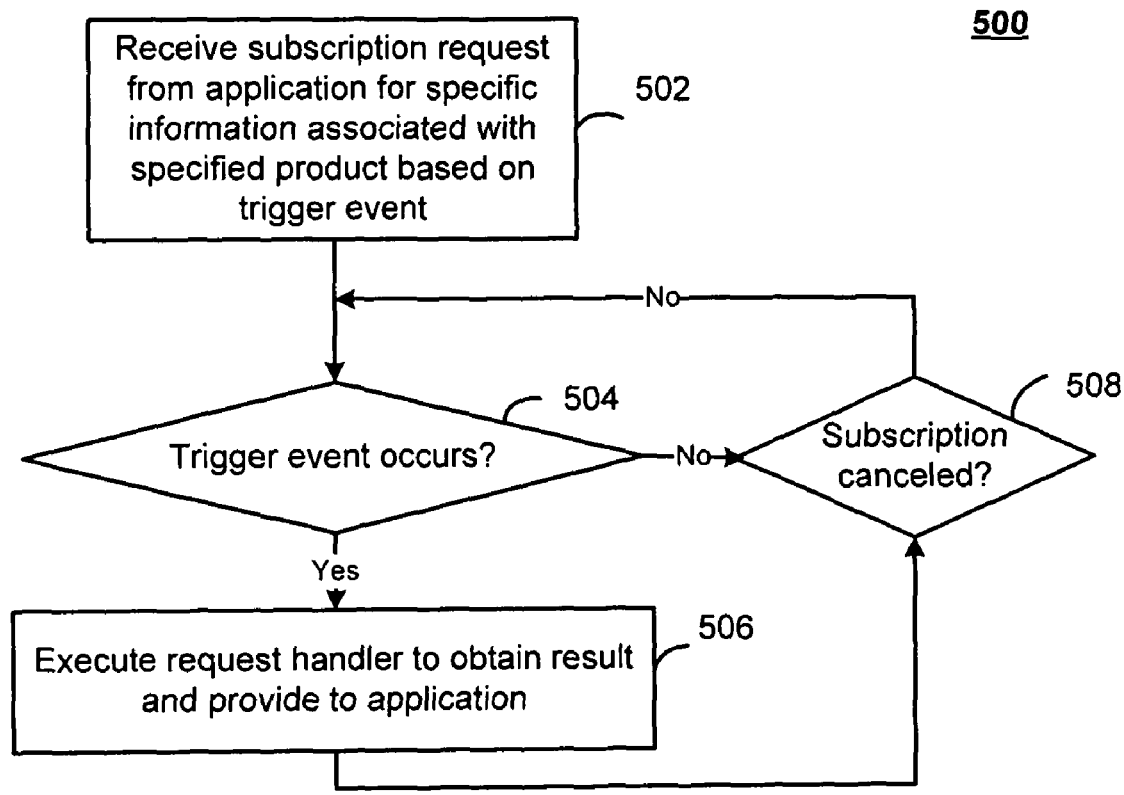
FIG. 5 is a flowchart illustrating example operations of the system of FIG. 1 using subscription-based product lifecycle management.

FIGS. 4-5 are flowcharts illustrating example operations of the system of FIG. 1 for product lifecycle management. Two example scenarios for an application to access data from PEIDs using middleware may include a request/response scenario and a subscription scenario. In the request/response scenario, for example, a single request may be received, and a single result may be returned, whereas in the subscription scenario, a request may be ongoing. For example, a subscription request may request a response upon the occurrence of a triggering event, such as, for example, detection of a sudden spike in temperature of a product, or a request for data regarding the state of a product to be transmitted every five minutes.

FIG. 4 illustrates example operations of the system of FIG. 1 for product lifecycle management according to a request/response scenario. Thus, a request may be received from an application via a request buffer for information associated with a specified product (402). For example, as discussed previously, the application 108 may place a request in which the information relating to the product 102 (e.g., manufacturing date, serial number, operational status, etc.) and an identifier of the product 102 may be specified, into the request buffer 156. Optionally, an expiration time interval may be specified, after which the request may be timed-out.

A determination may be made whether the product, e.g., the product 102 may be connected to the network (404). For example, the connection manager 138 may be queried to determine whether the product 102 is currently connected. If the specified product is not connected to the network, the request may be buffered (406), e.g., via the request buffer 156.

If the specified product is connected to the network, it may be determined, based on the device metadata 164 and the service metadata 162, for example, whether the requested information is directly available on a PEID, for example, the PEID 104 (408).

If not, a service description may be retrieved from the service repository, e.g., the service repository 160 (410), as the requested information may require data processing using data processing components. As discussed previously, the service description may include, for example, which atomic components, or component services, are included in the composite service. The description may also include an entry point for the service, for example, an entry point for the component service of the composite service that is to be called first, and various parameter settings for the involved component services, for example, thresholds, class limits, sampling frequencies, buffer capacities, etc.

The composite service may then be invoked based on the entry point (412), for example, by the request handler 152. As discussed previously, if the invoked component service is dependent on other components, those components may be called subsequently. Thus, a component service may be called (414). Step (414) may be repeated until a called component service depends on external input (416) such as a sensor value (e.g., from sensors 118), a counter value stored on the product 102, or any other data from the product 102.

The requested raw data maybe retrieved from the product 102 and returned to the requestor (418), which may be the request handler 152 or a calling component service. Step (418) is performed if the requested information is directly available on the PEID at step (408).

If the requester is a calling component service (420), the retrieved data may be processed and returned to the caller (422). Step (422) is repeated until the entry point of the composition is reached (424).

When the entry point of the composition is reached (424), or if the requester is not a calling component service at step (420), the requested result, for example, the analysis result, may be received, for example, by the request handler 152, and maybe stored in the result buffer (426), for example, the result buffer 158. The requesting application, for example, the application 108, may be notified that the requested result, for example the analysis result, is in the result buffer (428), for example the result buffer 158. The request, for example, the request for the analysis result, may then be deleted from the request buffer (430), for example, the request buffer 156.

FIG. 5 is a flowchart illustrating example operations of the system of FIG. 1 using subscription-based product lifecycle management. A subscription request may be received from the application, for example, application 108, for specific information, for example, temperature fluctuations, associated with a specific product, for example, the product 102, based on a trigger event (502), for example, a detection by the PEID 104 of a sudden spike in temperature based on data from the sensors 118. A subscription may include a permanent request, which may be executed based on triggering events, for example, on passage of specified time intervals or when an underlying value (e.g., temperature, pressure, humidity) changes.

When the triggering event (e.g., time interval elapsed, or value change) occurs (504), the request may be executed as described in steps (404) - (426) of FIG. 4 as discussed previously (506).

The subscription may end, for example, when the application, for example, the application 108 may cancel the subscription (508).

Thus, using techniques described herein, sensor data or smart device data, for example, may be processed on its way through the network, with appropriate utilization of available computing power and network bandwidth. In other words, the processing of data may be placed as close as possible to the data source with consideration of hardware restrictions of PEIDs at the edges of the network, which may thus reduce the amount of data effectively before it is passed on to a consuming backend application.

Besides the reduction of large amounts of data transfer and storage, another benefit may include the flexible analysis of data for different application scenarios that may exist, for example, in systems involving product lifecycle management. However, the system discussed herein is not restricted to product lifecycle management, as the system may be applicable to other examples such as supply chain management, or home automation. Generally, the system discussed herein may be used in most scenarios in which software systems need to be connected, for example, to embedded systems.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. A method comprising:
   receiving a request at a service manager from an application located at an application layer for an analysis result associated with an analysis of data generated by one or more sensors and a composite service, the one or more sensors being devices in a device layer;
   in response to receiving the request at the service manager, dynamically determining the composite service associated with the analysis of data generated by the one or more sensors, wherein the composite service includes multiple component services and each of the component services is deployable and executable in different service execution environments and the composite service is associated with service metadata including information describing the composite service and an indication of an ordering of execution of the component services to achieve a desired result of processing, and including a first component service and a second component service having an ordering of execution for the analysis of the data based on the service metadata;
   determining, by the service manager in an automated manner, the component services, the ordering of the execution of the component services and a deployment plan for the component services;
   deploying the first component service to a first service execution environment located at the device layer, the first component service configured to generate a first result;
   deploying the second component service to a second service execution environment located at a device handling layer, which is part of a middleware layer in communication with the device layer and an application layer, the second component service configured to generate a second result based on the first result, wherein the deployment of the first component service to the device layer and the second component service to the device handling layer is determined based on the ordering of execution and device metadata, the device metadata including information related to the devices;
   invoking the composite service based on an entry point of the composite service, wherein invoking the composite service starts execution of the first component service and the second component service according to the ordering of execution; and
   receiving the analysis result and communicating the analysis result to the application, wherein the analysis result is based on the second result generated by the second component service at the middleware layer, the second result being based on the pre-processed first result at the device layer.

2. The method of claim 1 wherein receiving the request for the analysis result comprises receiving the request for the analysis result from a request buffer configured to store requests generated by a business application located at a backend system, and wherein one or more of the sensors is associated with a product embedded information device (PEID).

3. The method of claim 1 wherein receiving the request for the analysis result comprises receiving a subscription request for the analysis result.

4. The method of claim 1 wherein determining the composite service comprises determining one or more service executables and the service metadata of the composite service from a service repository.

5. The method of claim 1 wherein the first component service is configured to generate the first result based on the analysis of data collected directly from one or more of the sensors.

6. The method of claim 1 wherein the device metadata includes device characteristics of each device located at the device layer.

7. The method of claim 6 wherein the device characteristics include one or more of a device description, a device name, a device identifier, a device type, a device vendor, a software description, an operating system description, a service, a hardware description, a processor description, a connection description, a connection speed, a connection type, a memory description, a total memory, a free memory, battery power indicator, a device status, or an execution platform.

8. The method of claim 1 wherein the second component service is configured to calculate the second result using one or more of a linear regression, a moving average, threshold monitoring, a notification, or a number of occurrences of an event or item.

9. The method of claim 1 wherein the device layer includes one or more of a radio frequency identification (RFID) reader, a smart items device, a device within a sensor network, a sensor mote, or a product embedded information device.

10. The method of claim 1 wherein receiving the request for the analysis result comprises receiving the request for the analysis result from a product lifecycle management (PLM) application and wherein one or more of the sensors is configured to generate data associated with a specified product.

11. A system including computer-readable instructions recorded on a non-transitory computer readable medium and executable on one or more computing devices, the system comprising:
   a middleware layer deployed on at least one of the computing devices, the middleware layer including a request handling layer deployed on the at least one computing device and a device handling layer deployed on the at least one computing device, the middleware layer in communication with an application and a device layer including one or more devices, wherein the request handling layer includes:
      a service repository that is configured to store at least one composite service, wherein the composite service includes multiple component services and each of the component services is deployable and executable in different service execution environments and the composite service is in association with service metadata including information describing the composite service and an indication of an ordering of execution of the component services to achieve a desired result, the composite service including a first component service and a second component service, the first component service being configured to generate a first result and the second component service being configured to generate a second result based on the first result;

a request handler that is configured to receive from the application located at the application layer a request for an analysis result associated with an analysis of data generated by the one or more devices during execution of the composite service and to receive the analysis result, wherein the analysis result is based on the second result generated by the second component service at the middleware layer, the second result being based on the pre-processed first result at the device layer; and a service manager that is configured to:
dynamically determine the composite service in response to the request for the analysis result from the application;
determine in an automated manner the component services, the ordering of the execution of the component services and a deployment plan for the component services;
determine device metadata including information relating to the devices and being associated with each of the devices;
initiate deployment of the first component service to a first service execution environment located at the device layer; and
initiate deployment of the second component service to a second service execution environment located at the device handling layer based on the service metadata, including the ordering of execution, and the device metadata.

12. The system of claim 11 wherein the device layer includes one or more of a radio frequency identification (RFID) reader, a smart items device, a device within a sensor network, a sensor mote, or a product embedded information device.

13. The system of claim 11 wherein the service repository is configured to store one or more service executables and the service metadata associated with the composite service.

14. The system of claim 11 wherein the second component service is configured to calculate one or more of a linear regression, a moving average, threshold monitoring, a notification, or a number of occurrences of an event or item.

15. A service manager including computer-readable instructions recorded on a non-transitory computer readable medium and executable on one or more computing devices, the service manager being deployed on a computing device and configured to:
receive a request at the service manager from an application layer for an analysis result associated with an analysis of data generated by one or more sensors and a composite service, the one or more sensors being devices in a device layer;
in response to receiving the request at the service manager, dynamically determine the composite service associated with the analysis of data generated by the one or more sensors, wherein the composite service includes multiple component services and each of the component services is deployable and executable in different service execution environments and the composite service is associated with service metadata including information describing the composite service and an indication of an ordering of execution of component services to achieve a desired result of processing, and including a first component service and a second component service having an ordering of execution for the analysis of the data based on the service metadata;
determine in an automated manner, the component services, the ordering of execution of the component services and a deployment plan for the component services;
initiate deployment of the first component service to a first service execution environment located at the device layer, the first component service configured to generate a first result;
initiate deployment of the second component service to a second service execution environment located at a device handling layer, the second component service configured to generate a second result based on the first result, wherein the deployment of the first component service to the device layer and the deployment of the second component service to the device handling layer is determined based on the ordering of execution and device metadata, the device metadata including information relating to the devices; and
invoke the composite service based on an entry point of the composite service to obtain the analysis result, wherein invoking the composite service starts execution of the first component service and the second component service according to the ordering of execution and wherein the analysis result is based on the second result generated by the second component service at the middleware layer, the second result being based on the pre-processed first result at the device layer.

16. The service manager of claim 15 wherein the second component service is configured to calculate the second result using one or more of a linear regression, a moving average, threshold monitoring, a notification, or a number of occurrences of an event or item.

17. The service manager of claim 15 wherein the device layer includes one or more of a radio frequency identification (RFID) reader, a smart items device, a device within a sensor network, a sensor mote, or a product embedded information device.

18. The service manager of claim 15 wherein the request for the analysis result includes a subscription request for the analysis result.

* * * * *